United States Patent [19]
Meyers

[11] Patent Number: 5,864,832
[45] Date of Patent: Jan. 26, 1999

[54] METHOD AND APPARATUS FOR SELECTING HIGHER ORDER TERMS FOR A HOLOGRAPHIC NEURAL NETWORK

[75] Inventor: Nathan Kallman Meyers, Portland, Oreg.

[73] Assignee: Hewlett-Packard Company, Palo Alto, Calif.

[21] Appl. No.: 789,673

[22] Filed: Jan. 24, 1997

[51] Int. Cl.$^6$ ................................................ G06F 15/18
[52] U.S. Cl. ........................................................ 706/13
[58] Field of Search ................................. 395/13, 22, 25; 706/13

[56] References Cited

U.S. PATENT DOCUMENTS 5,140,530  8/1992  Guha et al. ............................... 706/13

OTHER PUBLICATIONS

Los Angeles Times, Business Section, "The Cutting Edge", Leslie Helm, Oct. 28, 1996, pp. D1 and D8.

D.J. Janson and J.F. Frenzel, "Training Product Unit Neural Networks with Genetic Algorithms," IEEE Expert, pp. 26–33, Oct. 1993.

B.T. Zhang and H. Muhlenbein, "Synthesis of Sigma–Pi Neural Networks by the Breeder Genetic Programming," Proc. First IEEE Conf. on Evolutionary Computation, vol. 1, pp. 318–323, Jun. 1994.

Primary Examiner—Robert W. Downs

[57] ABSTRACT

A method and apparatus for selecting terms, preferably higher order terms, for use in a stimulus vector of a holographic neural network. The method includes an evolutionary type algorithm in which stimulus vector arrangements are preferably modelled as chromosomes containing genes that each uniquely identify one of a plurality of terms in a corresponding stimulus vector. Techniques for introducing variation and for selecting fit chromosome/stimulus vector arrangements are also disclosed, as is an apparatus for executing the term selecting method.

16 Claims, 2 Drawing Sheets

METHOD AND APPARATUS FOR SELECTING HIGHER ORDER TERMS FOR A HOLOGRAPHIC NEURAL NETWORK

FIELD OF THE INVENTION

The present invention relates to neural networks and more specifically to term selection in holographic and related neural networks.

BACKGROUND OF THE INVENTION

In an effort to overcome the shortcomings of conventional neural networks, holographic neural networks have been developed. Holographic neural networks include two vectors and one matrix, all of complex numbers. The two vectors include the S or stimulus vector (length n) and the R or response vector (length m). The matrix is the X matrix (size n×m) that describes a mapping from S to R. These networks offer several advantages over conventional neural networks including that they are simpler to train and discern. In addition, while conventional neural networks are usually structured to approximate digital quantities, holographic neural networks are well suited to representing continuously valued mappings.

Notwithstanding these comparative benefits, first order holographic neural networks are limited in the complexity of the mapping that can be encoded. This is because (1) the X matrix has a finite capacity to contain encodings and (2) the encoding is unable to represent complex interrelationships between discrete components in the stimulus vector.

These disadvantageous aspects are addressed, however, through the provision of higher order terms in the stimulus vector (where a higher order term is defined as a product of two or more initial input first-order terms). The generation of higher order terms allows a large increase in the size and therefore encoding capacity of the network matrix. For example, from 10 distinct first-order terms, 55 distinct second-order terms and 220 distinct third-order terms can be generated. Higher order terms also represent interactions between discrete first-order components of the stimulus vector, allowing the holographic neural network to represent such interactions in a manner similar to that of conventional neural networks. Finally, higher order terms tend to be more evenly distributed through the phase space than first-order terms and this also increases encoding capacity.

With the availability of higher order terms, the design of a holographic neural network is directed toward the selection of which higher order terms to include in the stimulus vector. This choice can be extremely difficult and is a primary design challenge in the creation of useful holographic neural networks.

SUMMARY OF THE INVENTION

Accordingly, it is an object of the present invention to provide a method of selecting optimal terms for inclusion in the stimulus vector of a holographic neural network.

It is another object of the present invention to provide such a method that incorporates an evolutionary type algorithm.

And it is yet another object of the present invention to provide an electronic apparatus for executing such a method.

These and related objects of the present invention are achieved by the method and apparatus of selecting terms for use in a holographic neural network disclosed herein.

In one embodiment of the present invention a method is disclosed that includes the steps of creating a plurality of stimulus vectors, each stimulus vector having at least one higher order term; evaluating said plurality of stimulus vectors to determine a relative fitness thereof; selecting a subset of the plurality of stimulus vectors based on their relative fitness; modifying the content of at least one of said stimulus vectors in said subset; and selecting a final stimulus vector from said modified subset. This method may also include the step of modelling each stimulus vector as a chromosome containing a plurality of genes which individually point to a term in a corresponding stimulus vector. The subset selecting step may include the steps of deleting a least fit one of the plurality of stimulus vectors and duplicating a best fit one of the plurality of stimulus vectors. The modifying step may include the steps of swapping genes between two chromosomes or replacing genes in a chromosome with new genes.

In another embodiment of the present invention a method is disclosed for forming a holographic neural network. This method comprises some or all of the above mentioned steps and further includes the provision of first order input data and the formation of an X matrix which the stimulus vector is multiplied by to produce a response output vector.

In yet another embodiment of the present invention an apparatus is disclosed that executes a stimulus vector term selection algorithm. This apparatus may include a processor, memory, means for receiving stimulus vector input data and means for generation an output of a response vector output signal.

The attainment of the foregoing and related advantages, features and configurations of the present invention should be more readily apparent to those skilled in the art, after review of the following more detailed description of the invention taken together with the drawings.

DETAILED DESCRIPTION

Figure 1:
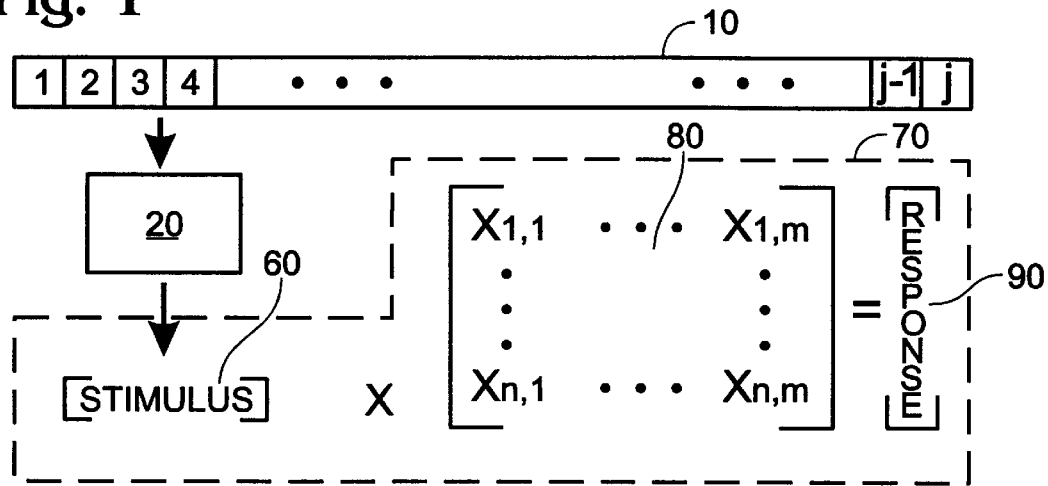
FIG. 1 is a diagram of a holographic neural network incorporating term selection in accordance with the present invention.

Referring to FIG. 1, a block diagram of a holographic neural network is shown. The first order input terms are provided in a one dimensional array 10 (hereinafter referred to as first order array 10) and each term is specified by a sequential index, 1-j, where j=number of first order terms. The first order input terms are pre-processed data points from which the holographic network attempts to recognize a pattern. The pattern may relate to any of a number of fields including weather forecasting, stock and interest rate forecasting, face recognition, voice recognition, x-ray analysis, and computer-user interfaces, etc. A method of the present invention, represented by reference numeral 20, acts on array 10 to create higher order terms for a stimulus vector 60 of a holographic neural network 70. The stimulus vector 60 is multiplied by the X matrix 80 as is known to produce a response vector 90. The stimulus vector, X matrix, and response vector make up the holographic neural network.

The present invention utilizes an evolutionary type algorithm for selection of higher order terms from first order array 10. Potential solutions (potential higher order term combinations) are preferably modeled as chromosomes that consist of genes (selected higher order terms). describing pieces of the solution. A correspondence is established between the chromosomes (which may be referred to as the genotype) and the solution represented by the chromosomes (which may be referred to as the phenotype). A fitness function to evaluate the phenotype and a method for selecting parents based on fitness are provided. In addition, techniques are defined for chromosome mating, mutation and propagation.

A high-level description of a preferred embodiment of the evolutionary optimization process of the present invention is as follows:

```
Create an initial population of N random
chromosomes representing N possible solutions.
    Initialize best_solution chromosome to an invalid
value.
Loop {
    Evaluate every chromosome in the population for
fitness; if a chromosome is more fit than the current
best_solution chromosome or if current best_solution
chromosome is invalid, copy it to the best_solution
chromosome.
    Select a pool of N chromosomes for propagation
according to fitness; represent the fittest chromosomes
more than once in the pool, i.e., duplicate the fittest
chromosomes, and do not represent the least fit
chromosomes i.e., remove the least fit chromosomes.
    Randomly select P pairs of chromosomes from the
pool for crossover (mating). For each pair, generate
two new chromosomes by applying a crossover operator.
    For each of the remaining N-2P chromosomes in the
pool, modify a predefined percentage of the chromosomes
and the genes therein by applying a mutation operator.
    Define the new population as the N chromosomes
generated by the above crossover and mutation steps.
}
```

The three user-specified parameters in the above description are population size, N, number of chromosome pairs to be selected for crossover, P, and the percentage of chromosomes and genes therein to mutate. The value of N will vary widely depending on application and is preferably large enough to foster maintenance of diversity. A designer/user can select N by trial and error based on performance measurements. P and mutation percentage will vary in a manner similar to N. The above process is preferably configured to continually seek the best solution to date and to terminate on some user-specified condition (such as exceeding a threshold quality-of-solution or time-of-computation value). Aspects of the stimulus vector optimization process are now discussed in more detail.

Genetic Representation

Figure 2:
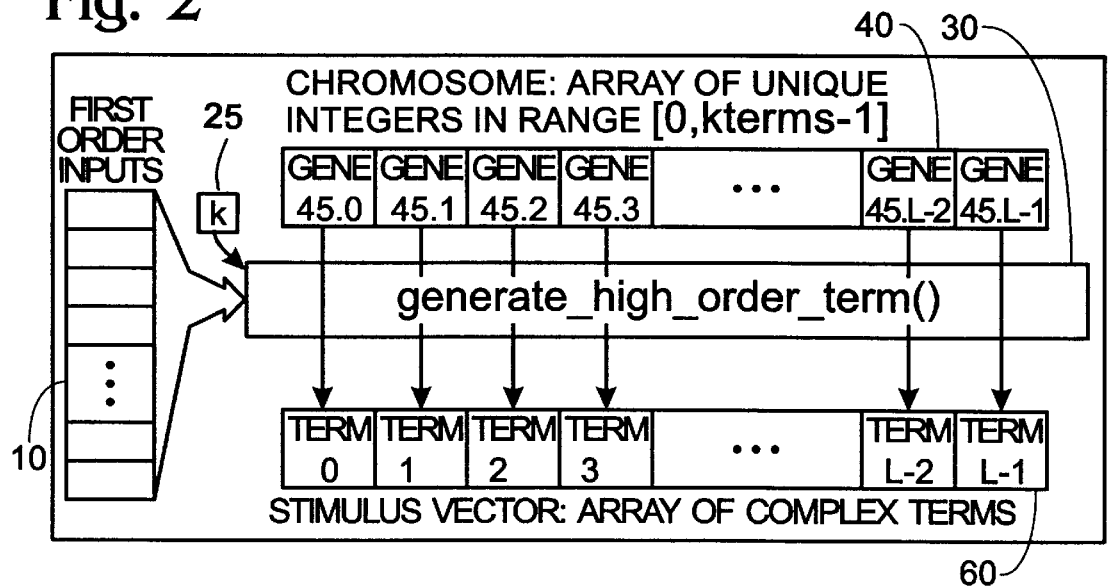
FIG. 2 is a block diagram of the relationship between a chromosome and a stimulus vector in accordance with the present invention.

Referring to FIG. 2, a block diagram of the relationship between a chromosome and a stimulus vector in accordance with the present invention is shown.

The first order array 10 is operated upon by a function 30 (discussed below) that generates higher order term indexes. This function 30 combines indexes of first order terms in array 10 in a predefined manner to create indexes of terms on a user specified order, k, represented by block 25. For example, to form a second order term index, function 30 may combine the indexes of first order terms 2 and 17. For a third order term, the indexes of first order terms 2, 17 and 32 may be combined by function 30. Thus, function 30 effectively forms a virtual pool of k order term indexes which may be dipped into when a new term index is needed as in chromosome formation, the duplicate replacement step of the crossover operator, or during mutation (discussed below).

A chromosome formation algorithm (discussed below) forms chromosome 40 which is representative of any one of the N chromosomes described herein. Chromosome 40 includes a plurality of L genes 45.0 to 45.L−1 and each gene contains an integer uniquely indexing a higher order term created by function 30. The higher order term to which a gene in chromosome 40 points is preferably provided in a corresponding location in stimulus vector 70. The terms in stimulus vector 70 are designated 70.0 to 70.L−1.

Assuming that there are j first-order stimulus terms, the number of possible unique $k^{th}$ order terms (hereinafter referred to as kterms) is provided by the equation: kterms= $(j+k-1)!/k!(j-1)!$ where k=term order. By enumerating the possible unique products, a gene can represent a $k^{th}$ order term as an integer in the range 0 to kterms. The following C++ code fragment presents an iterative method of function 30 for generating the $k^{th}$ order term for gene number q (where q∈[0,kterms−1]) from the j-length complex array 10 containing first-order terms. This iterative method is called for each gene 45 in chromosome 40.

```
complex generate_high_order_term(
    complex *firstorder,        //Array of first-order terms
    int q,                       //Gene value in range [0, kterms-1]
    int j,                       //Number of first-order terms
    int k)                       //kth order term to be generated
{
    //
    //This method realizes a mapping from a subset of integers to
    //a high-order term created from the given first order terms.
    //Each gene number in the range [0, kterm-1] maps to a unique
    //product of k of the terms present in the j-length first order
    //vector.
    //
    complex result = 1.0;       //Initialize to real 1.0
    int kelements = j;
    int offset = 0;
    int count = 1;
    int order = k;
    for (int i = 0; i < order - 1; i++)
        count = count * (kelements + i) / (i + 1);
    for (;;)
    {
        if (q < count)
        {
            result *= firstorder[offset];
            if (--order <= 0) break;
            count = count * order / (kelements + order - 1);
        }
        else
        {
            offset++;
            q -= count;
            if (--kelements <= 0) break;
            count = count * kelements / (kelements + order - 1);
        }
    }
    return result;
}
```

Chromosome 40 is preferably configured as a one dimensional array (thus modeling its biological analogue), though other arrangements such as a two dimensional array are contemplated. The length of chromosome 40 is specified by a user and is dependent on the desired capacity of the holographic network. This dependency comes about because the chromosome's length determines the stimulus vector's length which in turn determines the capacity of the network. General criteria for chromosome length determination includes that the resultant stimulus vector should not be short enough for the network to saturate and should not be long enough that the resultant network does not generalize well. Techniques for stimulus vector length selection are known in the art.

It should also be noted that the length of chromosome 40 can be of uniform, non-uniform, fixed or varied lengths. It should also be noted that the chromosomes may contain terms of varied order (including first order terms) or of identical order.

A high level description of the generation of an initial chromosome is generally as follows.

Using function 30, randomly generate L terms and assign each to one of L gene locations in chromosome 40.

This step produces a chromosome which can encode indexes to any combination of terms (any possible solution).

To facilitate a better understanding of chromosome composition, the following example is provided. Given $j=200$ first order inputs and a chromosome indexing wholly second order terms ($k=2$), the number of unique higher order terms that function 30 can create indexes to, termed kterms, is $(j+k-1)!/k!(j-1)!=(200+2-1)!/2!(200-1)!=201!/2!199!=200\times201/2=20100$. If the desired chromosome length is $L=50$, then the foregoing step randomly selects 50 of the 20100 kterms indexes to form an initial configuration of a chromosome.

This formation process is repeated N times to form the initial N chromosomes.

Measuring Fitness of a Chromosome

Once a chromosome 40 has been constructed, it must be ascertained whether the stimulus vector components encoded therein are well-suited to building a holographic neural network that accurately encodes the stimulus-response mapping. Further, it must be determined which of the pool of N chromosomes performs best. This determination is preferably made using two sets of stimulus and response data in which an expected response vector is known for its corresponding stimulus input data. Each stimulus input data and corresponding response vector is referred to as a stimulus-response vector pair in the discussion which follows.

The two sets of data are the training set and the optimization set. A user encodes the network with the plurality of stimulus-response vector pairs in the training set and then examines how well the resulting network generalizes with the optimization set. The observed generalization ability is the measure of fitness.

Encoding is achieved as follows. Stimulus input data is processed to form the terms specified by the chromosome under test. The corresponding stimulus vector is multiplied by the X matrix to produce a response vector and the value of that response vector is subtracted from its expected value to produce a difference value. The X matrix, which has an initial value of zero, is then adjusted based on the difference value such that subsequent multiplications of the subject stimulus vector by the X matrix produces approximately the expected response vector or a value associated therewith as is known. Encoding is known in the art and the encoding process is carried out for each stimulus-response vector pair in the training set.

The optimization set is similar to the training set in that it includes a plurality of known stimulus-response vector pairs. The optimization set is not used, however, to train the network but to test how well the matrix generalizes. The generated response vector (termed the "recall response") is compared to its expected value and the magnitude of the difference is saved. The difference of subsequent optimization set stimulus-response vector pairs is added to the previously stored value to achieve a final difference or "SUM_ERROR" signal. This signal may be compared to like signals from other chromosome arrangements to determine relative fitness.

The SUM_ERROR characterizes the ability of the network to generalize to the optimization set. The method for computing the error measures that make up the SUM_ERROR is at the discretion of the user but is generally within known criteria. For example, the measure might simply be the magnitude of the difference between two complex vectors (the recall response and the expected response), though this measure carries risk in that error in one term of the complex response vector may not be nearly as significant as a large error in another term. The user may obtain a more meaningful error measure by post-processing the two outputs and computing an error term based on the accuracy of the post-processed response.

The SUM_ERROR indicates the fitness of a network incorporating a subject stimulus vector. After a SUM_ERROR has been generated for each of the N chromosomes, the collective SUM_ERRORs are ranked. One or more chromosomes with the least favorable SUM_ERROR values are removed, while one or more chromosomes with the most favorable SUM_ERROR values are duplicated. Chromosomes with highly favorable SUM_ERROR values may be duplicated more than once. Chromosomes are removed and duplicated such that a new, enriched group of N chromosomes is achieved.

Once the enriched group of N chromosomes is established, it is desirable to introduce new combinations or new material to these chromosomes to see whether performance can be improved. Thus, the composition of the N chromosomes is modified before subsequent evaluation. In a referred embodiment, this modification is provided by a crossover operator and a mutation operator as described below. The best .fit chromosome before modification is preferably saved and compared to the after modification chromosomes to make sure that the modifications have not decreased performance.

Crossover and Mutation

The present invention provides a crossover operator and a mutation operator. Though these operators apply to fixed-length chromosomes containing terms of the same order in the presently discussed embodiment, it should be recognized that the operators could be configured to apply to variable-length chromosomes or mixed-order terms by one skilled in the art given the teachings herein.

The crossover operator preferably functions as follows. P pairs of the N chromosomes, termed parents, are selected for propagation. For each pair of parents: (1) a crossover point is randomly selected, (2) genes after the crossover point are swapped, and (3) duplicate genes are replaced with genes randomly generated by function 30.

With respect to the mutation operator, a user specifies a percentage of the remaining chromosomes to modify. General criteria for selection of this percentage include that the resultant mutation should be sufficient enough to achieve a measurable change, while not being sufficiently great to cause instability. Empirical evidence has indicated that selecting five percent of the N size chromosome pool for mutation and mutating five percent of the genes within the selected chromosome pool achieves this goal, though the five percent standard may vary depending on application. It should also be recognized that to enhance diversity of solutions, the product of crossover operations can be mutated.

A high order description of the mutation process includes the following steps.

Select a predefined percentage of the N-2P chromosomes for mutation.

Randomly remove a predefined percentage of genes in the selected chromosomes.

Replace each removed gene with a randomly generated gene (from function 30).

While the present invention preferably includes both crossover and mutation operators, the invention may be practiced with only one of these operator with or without additional diversity generator(s). Though a crossover and a mutation operator are described it should be recognized that other methods of generating diversity and propagating same are within the present invention.

The evaluation steps discussed above, (i.e., training set and optimization set) are repeated for this modified group of chromosomes (including the previous best chromosome) to determine relative fitness. If an event has occurred for termination of the stimulus vector development process (the genetic algorithm), the most fit chromosome is selected for defining the stimulus vector of the final holographic neural network. If termination is not called for, the sequential select, modify, and evaluate steps are continued.

Generation of the Final Network

The genetic algorithm is terminated based on some user-specified criteria. Possible criteria include computation time, best solution exceeds a certain fitness level, and convergence (e.g., the best solution is not improved on for some number of generations), amongst other criteria. The result of the algorithm is a chromosome representing the optimal higher order stimulus vector for construction of a usable holographic neural network.

To create the final holographic network, the user invokes an encoding and optimization procedure that terminates when the measure of generalization begins to deteriorate. This encoding and optimization procedure preferably functions as follows. A holographic neural network is established that includes the selected stimulus vector and a null X matrix. This network is preferably trained and tested with the same sets of stimulus-response vector pairs and optimization stimulus-response vector pairs utilized in the fitness measurement procedure described above. A SUM_ERROR is accordingly produced. The network is then retrained and retested with the same vector-response pairs to generate a new SUM_ERROR value. Empirical evidence indicates that iteratively retraining the network with the same training set improves generalization up to a certain number of retrainings after which generalization degrades. Hence, the processes of sequentially retraining and retesting are preferably continued until the succeeding SUM_ERROR is greater than that of the preceding network. At this point, the preceding network (that which had the better SUM_ERROR) is recovered and implemented as the final holographic neural network.

Machine Implementation

Figure 3:
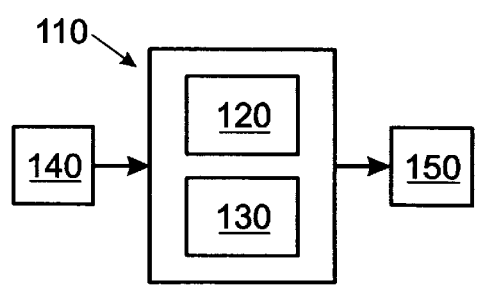
FIG. 3 is a block diagram of an electronic device for executing the subject method in accordance with the present invention.

Referring to FIG. 3, a block diagram of an electronic device 110 for executing the method described above is shown. The device may take many forms including a computer, a personal communicator, an electronic control for use in home, car or elsewhere, etc. The device preferably includes a processing unit 120 and memory 130 for executing the above described steps in a machine executable form. Given the teachings herein, the writing of a program to accomplish these steps, for example in C++, would be apparent to one skilled in the art.

Input data for array 10 is preferably provided via data input 140 which may include a sensor, scanner, keyboard, modem/adapter for downloading data, or other implement for receiving holographic neural network input data. Output device 150 preferably provides response vector data in a user recognizable format. Output device 150 may include a monitor, manufacturing device, loud speaker, signal generator, or other device for communicating the output of a holographic neural network.

Figure 4:
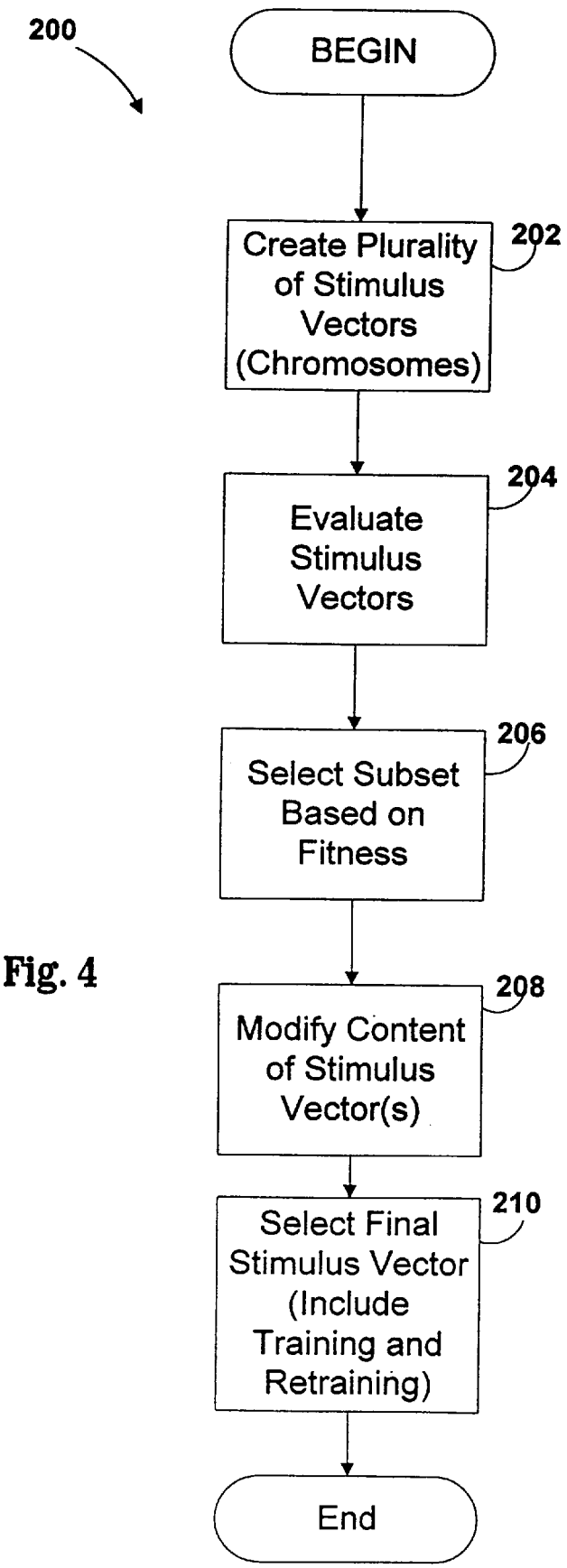
FIG. 4 is a flowchart of overall holographic neural network formation in accordance with the present invention.

Referring to FIG. 4, a flowchart 200 of overall holographic neural network formation in accordance with the present invention is shown. Step 202 indicates the creation of a plurality of stimulus vectors or chromosomes as discussed above. Step 204 indicates the evaluation of these stimulus vectors. Step 206 indicates selection of a subset of the stimulus vectors based on their measured fitness. Step 208 indicates modification of one or more of the stimulus vectors. This modification may include the exchange of terms between vectors (cross-over), modification of selected terms (mutation) or other modification. Step 210 indicates selection of a final stimulus vector which may include the steps of training and retraining a holographic neural network, amongst other steps.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

I claim:

1. A method for selecting terms for use in a holographic neural network, comprising the machine executable steps of:

creating a plurality of stimulus vectors, each stimulus vector having at least one higher order term;

evaluating said plurality of stimulus vectors to determine a relative fitness of each of said stimulus vectors;

selecting a subset of the plurality of stimulus vectors based on their relative fitness;

modifying the content of at least one of said stimulus vectors in said subset; and selecting a final stimulus vector from said modified subset.

2. The method of claim 1, wherein said creating step includes the step of:

creating a plurality of chromosomes each representative of one of said plurality of stimulus vector, each chromosome containing a plurality of genes each indicative of a term in a corresponding stimulus vector.

3. The method of claim 2, wherein said modifying step comprises the step of replacing one gene in at least one of said chromosomes.

4. The method of claim 1, wherein said subset selecting step comprises the steps of:

deleting a least fit one of said plurality of stimulus vectors; and duplicating a best fit one of said plurality of stimulus vectors.

5. The method of claim 1, wherein said modifying step comprises the step of:

swapping portions of two stimulus vectors in said subset.

6. The method of claim 1, wherein said modifying step comprises the step of:

replacing a predefined percentage of terms in one of said stimulus vector in said subset with a new term.

7. The method of claim 1, further comprising the steps of:

sequentially repeating said evaluating, subset selecting and modifying steps a plurality of times, and wherein each subsequent evaluating step operates on the modified subset generated in the preceding pass through these three steps.

8. The method of claim 7, wherein said final stimulus vector selecting step comprises the steps of:

stopping the sequentially repeating evaluating, subset selecting and modifying steps upon the occurrence of a predefined event; and selecting a stimulus vector having the best relative fitness from the last modified subset of stimulus vectors.

9. The method of claim 1, wherein said step of selecting a final stimulus vector comprises the steps of:

training a holographic neural network for at least two of said plurality of stimulus vectors in said modified subset with known stimulus and response data;

generating a value for each of said at least two stimulus vectors that indicate how well they generalize to known stimulus and response data; and selecting as a final stimulus vector the one of said two stimulus vectors that generalizes better.

10. The method of claim 9, further comprising the step of generating a final holographic network by:

training a holographic neural network incorporating said better generalizing stimulus vector with a first set of known stimulus and response data;

generating an optimization value for the network trained with said first set;

retraining a holographic neural network incorporating said better generalizing stimulus vector with a set of known stimulus and response data;

generating an optimization value for the retrained network; and selecting the network trained with said first set as the final holographic neural network when the optimization value for the retrained network indicates a worse generalization than the optimization value for said first set.

11. A method of creating a holographic neural network comprising the steps of:

providing a plurality of first order input data terms;

creating a plurality of stimulus vectors each containing a plurality of terms including at least one higher order term created by combining at least two of said first order terms;

evaluating said plurality of stimulus vectors to determine a relative fitness of each of said stimulus vectors;

selecting a subset of the plurality of stimulus vectors based on their relative fitness;

modifying the content of at least one of said stimulus vectors in said subset;

selecting a final stimulus vector from said modified subset; and providing an X matrix trained for said final stimulus vector.

12. The method of claim 11, wherein said step of creating a plurality of stimulus vectors includes the step of:

representing each stimulus vector as a chromosome having a plurality of genes with each gene uniquely identifying one of the plurality of terms in a corresponding stimulus vector.

13. The method of claim 11, wherein said subset selecting step includes the steps of removing a least fit stimulus vector and duplicating a best fit stimulus vector.

14. An apparatus utilizing a holographic neural network, comprising:

a processor;

memory coupled to said processor;

means coupled to said processor for providing stimulus input data;

logic means functioning in said processor and in conjunction with said memory for: creating a plurality of stimulus vectors each having a plurality of terms derived from said stimulus input data including at least one higher order term, evaluating said plurality of stimulus vectors to determine a relative fitness of each, selecting at least one of said stimulus vectors to undergo modification based on its relative fitness, and selecting one of said stimulus vectors after said at least one stimulus vector has been modified to be a final stimulus vector; and means for multiplying the terms of said final vector by an X matrix trained therefor to produce a response output signal.

15. The apparatus of claim 14, wherein said logic means further comprises means for representing each stimulus vector as a chromosome having a plurality of genes, and each gene uniquely identifies one of the plurality of terms in a corresponding stimulus vector.

16. The apparatus of claim 14, wherein said logic means include means for modifying the content of the at least one of said stimulus vectors selected to undergo modification.

* * * * *